United States Patent
Koide et al.

(10) Patent No.: US 6,851,972 B2
(45) Date of Patent: Feb. 8, 2005

(54) CONNECTOR DEVICE AND WIPER DRIVE MOTOR HAVING CONNECTOR DEVICE

(75) Inventors: Makoto Koide, Kosai (JP); Kiyoshi Oota, Hoi-gun (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 10/242,695

(22) Filed: Sep. 13, 2002

(65) Prior Publication Data

US 2003/0060060 A1 Mar. 27, 2003

(30) Foreign Application Priority Data

Sep. 26, 2001 (JP) ........................................ 2001-294480

(51) Int. Cl.[7] .............................................. H01R 27/00
(52) U.S. Cl. ........................................ 439/516; 310/89
(58) Field of Search ................................ 439/516, 519, 439/731; 310/89

(56) References Cited

U.S. PATENT DOCUMENTS

| | | | | |
|---|---|---|---|---|
| 4,029,896 A | * | 6/1977 | Skinner ................... | 174/138 F |
| 4,799,903 A | * | 1/1989 | Deurloo ....................... | 439/696 |
| 5,145,404 A | * | 9/1992 | Beattie et al. .............. | 439/521 |
| 5,656,878 A | | 8/1997 | Nakata ........................ | 310/71 |
| 5,723,924 A | * | 3/1998 | Blanchet ...................... | 310/85 |
| 6,066,010 A | * | 5/2000 | Wulff .......................... | 439/874 |
| 6,445,097 B1 | * | 9/2002 | Zeiler et al. .................. | 310/71 |

FOREIGN PATENT DOCUMENTS

| JP | A-H09-9562 | 1/1997 |
|---|---|---|
| JP | A-11-163553 | 6/1999 |

* cited by examiner

Primary Examiner—Phuong Dinh
(74) Attorney, Agent, or Firm—Posz & Bethards, PLC (57) ABSTRACT

A terminal assembly is assembled to a first housing segment of a connector housing. A pair of insertion projections is integrally formed to an internal surface of the first housing segment. One of the insertion projections is fit into a gap between cut ends of terminals in the terminal assembly. The other one of the insertion projections is fit into another gap between cut ends of other terminals in the terminal assembly.

11 Claims, 8 Drawing Sheets

CONNECTOR DEVICE AND WIPER DRIVE MOTOR HAVING CONNECTOR DEVICE

CROSS REFERENCE TO RELATED APPLICATION

This application is based on and incorporates herein by reference Japanese Patent Application No. 2001-294480 filed on Sep. 26, 2001.

BACKGROUND OF THE INVENTION

1. Field of the Invention

The present invention relates to a connector device that has a terminal assembly, which holds a plurality of terminals in an insulator, and a connector housing, which houses the terminal assembly and from which the terminals extend outwardly. The present invention also relates to a manufacturing method of such a connector device. The present invention further relates to a wiper drive motor having such a connector device.

2. Description of Related Art

In the connector device recited in Japanese Unexamined Patent Publication No. H09-9562, a plurality of plate-shaped first terminals is disposed in a first plane, and a plurality of plate-shaped second terminals is disposed in a separate second plane. The first terminals and second terminals are in separate layers, which are stacked one after the other. The first terminals are manufactured as an integral assembly such that adjacent ones of the first terminals are connected to each other through a corresponding connecting portion. During assembly, the integrally formed first terminals are separated from each other by cutting the connecting portions, thereby forming individual terminals, which are then assembled. The second terminals are likewise manufactured as an integral assembly such that adjacent ones of the second terminals are connected to each other through a corresponding connecting portion. During assembly, the integrally formed second terminals are separated from each other by cutting the connecting portions, thereby forming individual terminals, which are then assembled. The connecting portions are cut using a press machine or the like.

When each connecting portion, which connects between the adjacent terminals, is cut, the cut ends of each connecting portion formed by cutting are bent and are spaced from each other. However, when the connecting portion is simply cut, the cut ends may be insufficiently bent. When these terminals are then assembled, the adjacent cut ends of the connecting portion can be too close to each other or even touch each other. Electrical insulation failure can occur when the cut ends of the connecting portion are too close to each other or touch each other.

SUMMARY OF THE INVENTION

An objective of the present invention is to restrain occurrence of insulation failure in a connector device.

To achieve the objective of the present invention, there is provided a connector device, which includes a terminal assembly and a connector housing, which receives the terminal assembly. The terminal assembly includes a plurality of terminals. The terminals are arranged in at least one plane and are held by a dielectric holder. Each terminal includes at least one lateral projection, and each lateral projection is bent relative to the plane and is opposed to a corresponding one of the at least one lateral projection of adjacent one of the terminals. The connector housing includes at least one dielectric insertion projection. Each dielectric insertion projection is located between two corresponding opposed ones of the lateral projections.

To achieve the objective of the present invention, there is also provided a connector device, which includes a terminal assembly and a connector housing, which receives the terminal assembly. The terminal assembly includes a plurality of terminals. The terminals are held by a dielectric holder. Each terminal includes an external terminal portion and an internal electrical conductor portion. The connector housing includes a plurality of internal electrical lines and at least one separating projection. Each external terminal portion protrudes outwardly from the connector housing, and each internal electrical conductor portion is received within the connector housing. Each of at least two of the terminals includes a welding portion, which is welded to a corresponding one of the internal electrical lines. Each separating projection is placed between two corresponding adjacent ones of the welding portions.

To achieve the objective of the present invention, there is also provided a wiper drive motor, which includes a motor housing, a gear housing and a cover. The motor housing receives an armature. The gear housing is connected to the motor housing and receives a speed reducing mechanism. The gear housing has an open end, which is located adjacent to the speed reducing mechanism. The speed reducing mechanism reduces a rotational speed of the armature. The cover covers the open end of the gear housing and has a connector device. The connector device includes a terminal assembly and a connector housing, which receives the terminal assembly. The terminal assembly includes a plurality of terminals. The terminals are arranged in at least one plane and are held by a dielectric holder. Each terminal includes at least one lateral projection. Each lateral projection is bent relative to the plane and is opposed to a corresponding one of the at least one lateral projection of adjacent one of the terminals. The connector housing includes at least one dielectric insertion projection. Each dielectric insertion projection is located between two corresponding opposed ones of the lateral projections.

To achieve the objective of the present invention, there is provided a method for manufacturing a connector device. In the method, at least one terminal plate is provided. Each terminal plate includes a plurality of terminals, and adjacent ones of the terminals are connected only by at least one connecting portion. Then, each terminal of the at least one terminal plate is installed in an dielectric holder such that the terminals are held by the dielectric holder. Thereafter, each connecting portion of the at least one terminal plate is cut such that a cut end of each connecting portion, which is left in each terminal upon the cutting of each connecting portion, forms a lateral projection that is bent relative to a plane of the terminal plate. Next, the terminals, which are held by the dielectric holder, are installed to one of a plurality of housing segments of a connector housing. Then, the housing segments are assembled to form the connector housing. In the assembling of the housing segments, at least one dielectric insertion projection, which is provided in at least one of the housing segments, is installed to the terminals in such a manner that each dielectric insertion projection is inserted between two corresponding opposed ones of the lateral projections.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention, which is implemented in a wiper system, will be described with reference to FIGS. 1 to 8.

Figure 2A:
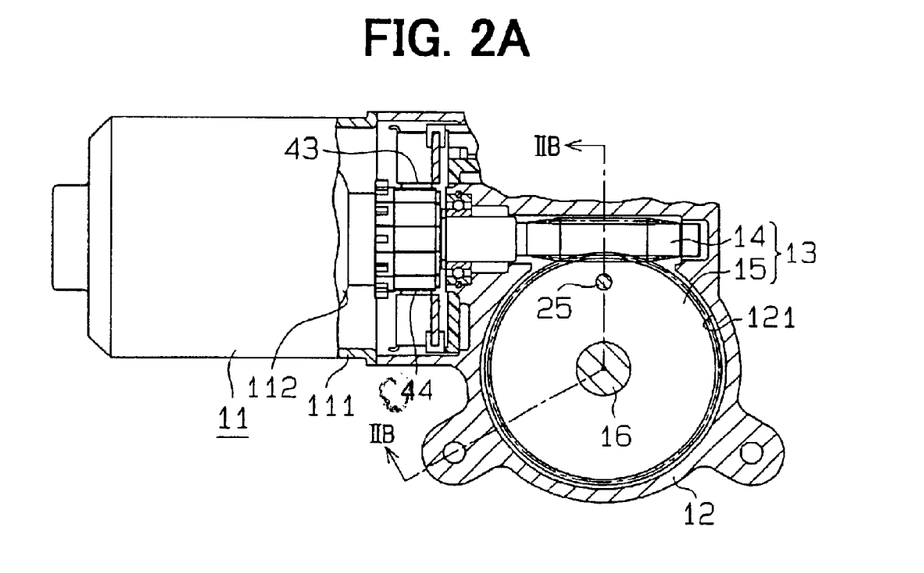
FIG. 2A is a partially cut-away side view of the wiper drive motor.

With reference to FIG. 2A, in a wiper drive motor 11 of the wiper system, a gear housing 12 is connected to a motor housing 111. A speed reducing mechanism 13 is received in the gear housing 12. The speed reducing mechanism 13 includes a worm 14 and a worm wheel 15. The worm 14 is rotatably supported by the gear housing 12 of the wiper drive motor 11, and the worm wheel 15 is meshed with the worm 14. The worm 14 also serves as an output shaft of the wiper drive motor 11. The worm wheel 15 is integrally secured to an output shaft 16 by insert molding, and the output shaft 16 is rotatably supported by the gear housing 12. The worm 14 is rotated when an armature 112 of the wiper drive motor 11 is continuously rotated in one direction, and rotation of the worm 14 is transmitted to the output shaft 16 through the speed reducing mechanism 13, which reduces the rotational speed of the worm 14.

Each wiper arm (not shown) is linked to the output shaft 16 by way of a crank mechanism (not shown). A wiper blade (not shown) connected to the wiper arm is swung reciprocally upon rotation of the output shaft 16.

Figure 2B:
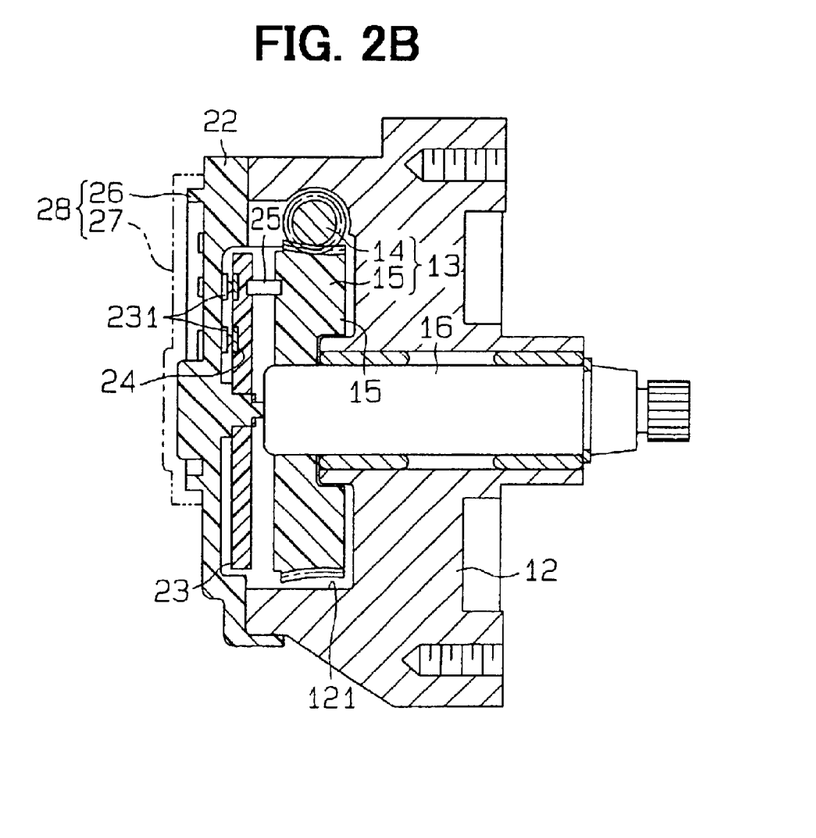
FIG. 2B is a cross-sectional view along line IIB—IIB in FIG. 2A.

As shown in FIG. 2B, a receiving recess (forming an open end of the gear housing) 121 is covered by a cover 22, which is made of a dielectric resin material. A disk-shaped follower 23 is rotatably housed inside the cover 22, which constitutes part of the gear housing 12. A conductive switching pattern 24 is formed in the dielectric resin disk part of the follower 23. A plurality of lever-shaped contact terminals 231 is fixed to an internal surface of the cover 22 in opposed relation to the switching pattern 24 such that the contact terminals 231 can slide into contact with the switching pattern 24. An engaging protrusion 25 is secured to an opposing face of the worm wheel 15, which opposes the follower 23, and the engaging protrusion 25 is engaged with the follower 23. Rotation of the worm wheel 15 in the one direction is transmitted to the follower 23 through the engaging protrusion 25, and the follower 23 rotates synchronously with the worm wheel 15. The contact terminals 231, which face the follower 23 that rotates synchronously with the worm wheel 15, engage and disengage relative to the switching pattern 24. The contact terminals 231 and the switching pattern 24 form a rotational position detector 49, which detects positions corresponding to wiping positions and a stop position of the corresponding wiper blade. Rotation of the worm wheel 15 in the other direction causes disengagement of the engaging protrusion 25, so that the rotation of the worm wheel 15 is not transmitted to the follower 23. Thus, the follower 23 maintains its current rotational position (maintains the switching state between the conductor terminals 231 and the switching pattern 24).

Figure 1A:
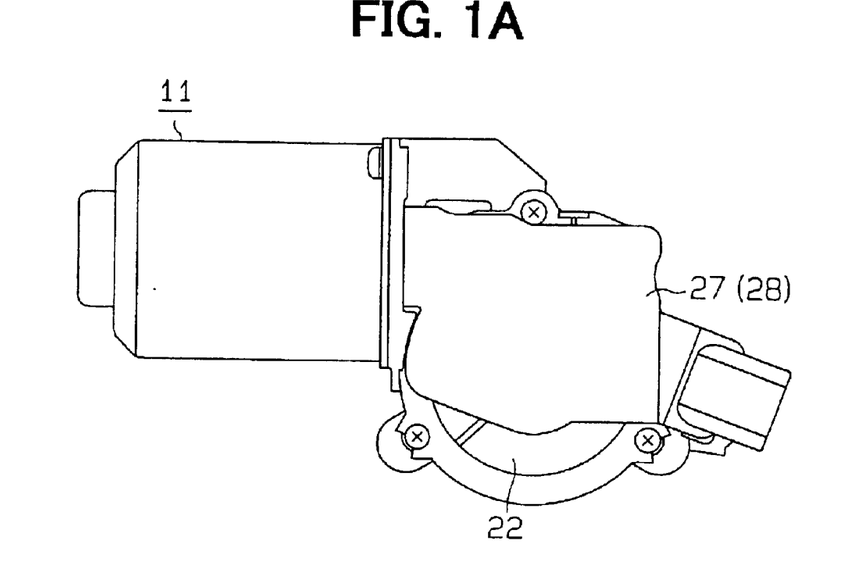
FIG. 1A is a side view of a wiper drive motor according to an embodiment of the present invention.
Figure 1B:
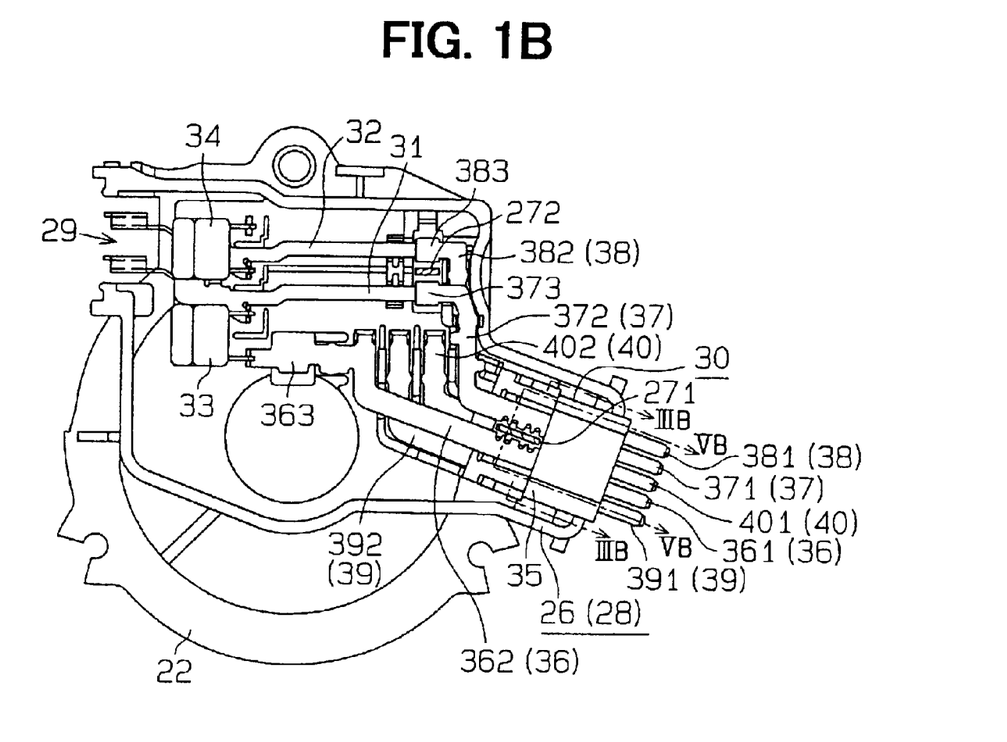
FIG. 1B is a side view showing internal features of a connector of the wiper drive motor according to the embodiment.

As shown in FIGS. 2B and 1A, a first housing segment 26 is integrally formed to an outer surface of the cover 22. A second housing segment 27, which is made of a dielectric resin material, covers and is secured to the first housing segment 26. The first housing segment 26 and the second housing segment 27 constitute a connector housing 28, and a circuit unit 29 shown in FIG. 1B is received in the connector housing 28. The circuit unit 29 includes a terminal assembly 30, internal electrical lines 31, 32 and capacitors 33 34.

Figure 6A:
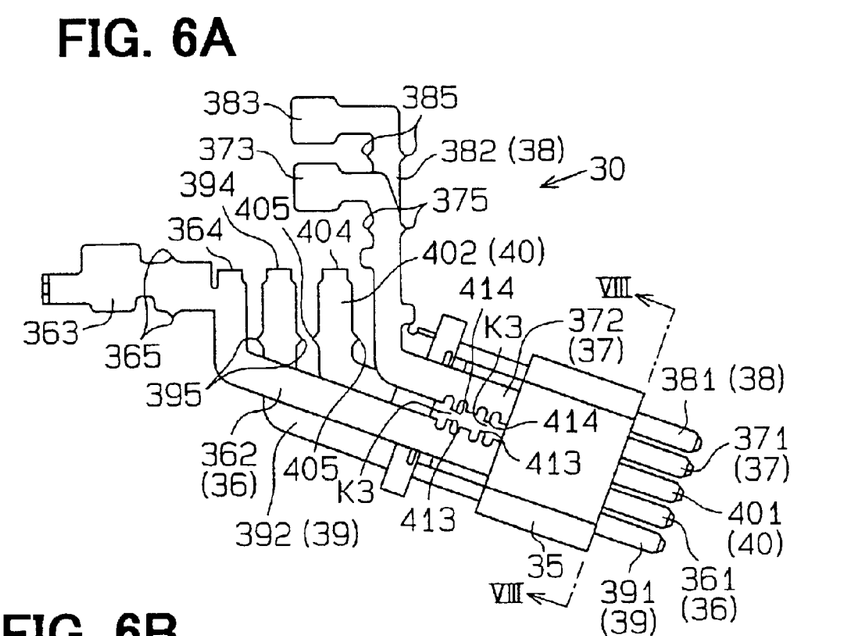
FIG. 6A is a side view from a first side of the terminal assembly according to the embodiment.
Figure 7A:
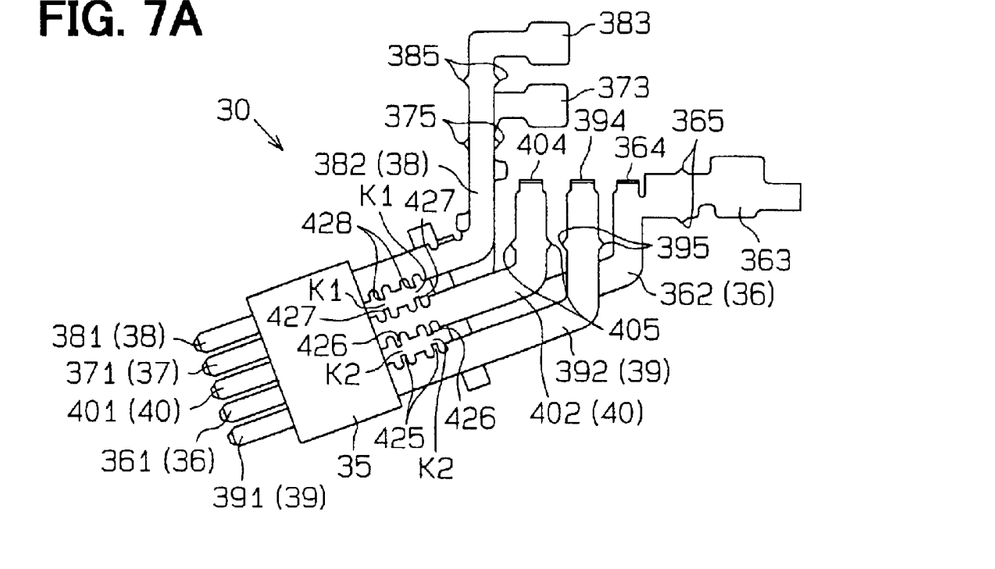
FIG. 7A is a side view from a second side of the terminal assembly.

As shown in FIGS. 6A and 7A, the terminal assembly 30 includes an insulator (serving as a dielectric holder of the present invention) 35 and a plurality of terminals 36–40, which are supported by the insulator 35. Each terminal 36–40 includes an external terminal portion 361, 371, 381, 391, 401, which protrudes outwardly from the connector housing 28, and an internal electrical conductor portion 362, 372, 382, 392, 402, which is received in the connector housing 28.

Figure 8:
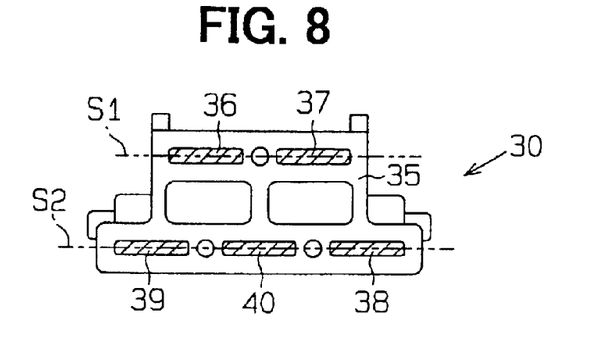
FIG. 8 is an enlarged section view along line VIII—VIII in FIG. 6A.

As shown in FIG. 8, the terminals 36, 37, which are connected to the insulator 35, are arrayed in a first plane S1. Furthermore, the terminals 38, 39, 40, which are connected to the insulator 35, are arrayed in a second plane S2. The first plane S1 and the second plane S2 are different planes and extend parallel to each other.

Figure 6B:
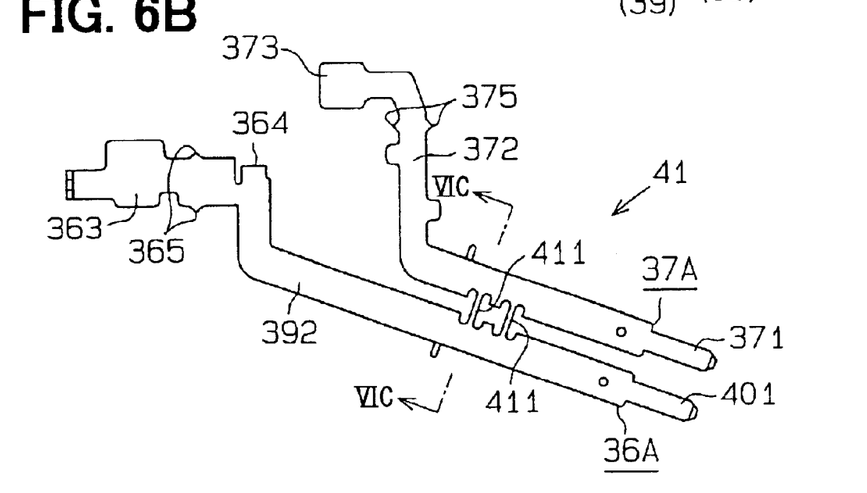
FIG. 6B is a side view of one terminal plate of the terminal assembly.
Figure 6C:
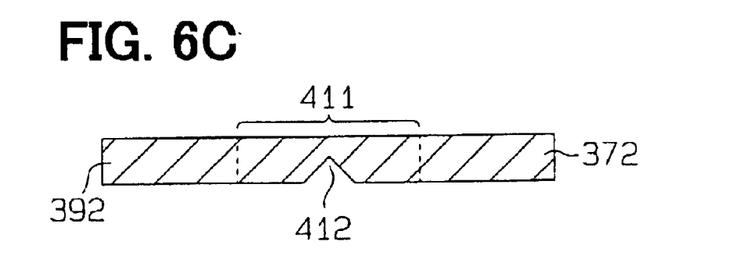
FIG. 6C is an enlarged sectional view along line VIC—VIC in FIG. 6B.
Figure 7B:
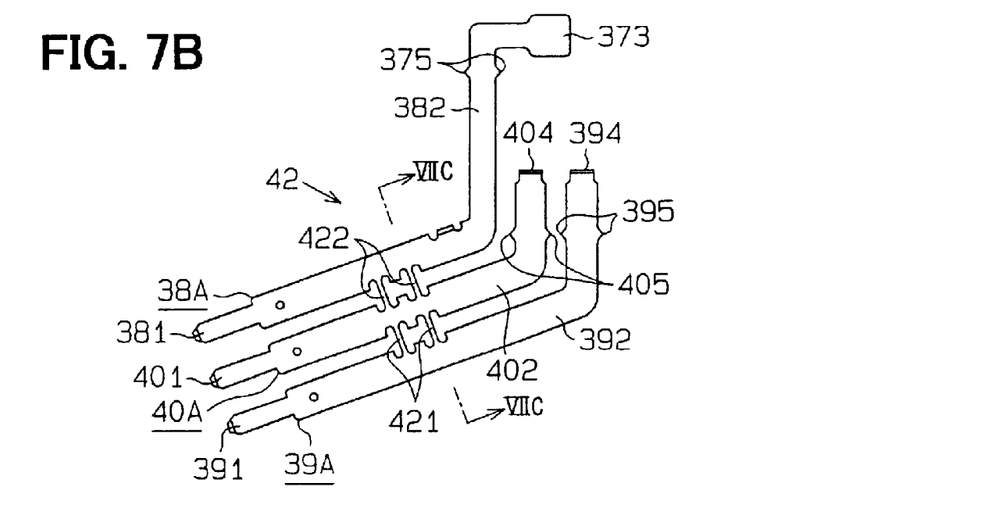
FIG. 7B is a side view of another terminal plate of the terminal assembly.
Figure 7C:
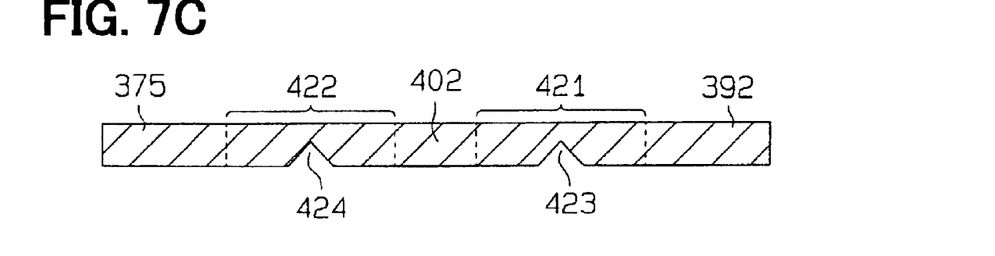
FIG. 7C is an enlarged sectional view along line VIIC—VIIC in FIG. 7B.

FIG. 6B shows a terminal plate 41 that serves as a material, from which the terminals 36, 37 are manufactured. FIG. 7B shows a terminal plate 42 that serves as a material, from which the terminals 38, 39, 40 are manufactured. Each terminal plate 41, 42 is formed from a thin conductive metal sheet or plate material. The terminal plate 41 includes sub-terminals 36A, 37A and a pair of connecting portions 411, each of which connects between the sub-terminals 36A, 37A. The terminal plate 42 includes sub-terminals 38A, 39A, 40A, a pair of connecting portions 421 and another pair of connecting portions 422. Each of the connecting portions 421 connects between the sub-terminals 39A, 40A, and each of the connecting portions 422 connects between the sub-terminals 38A, 39A. As shown in FIG. 6C, a recess (i.e., recessed section) 412 is formed in each of the connecting portions 411. Furthermore, as shown in FIG. 7C, a recess (i.e., recessed section) 423 is formed in each of the connecting portions 421, and a recess (i.e., recessed section) 424 is formed in each of the connecting portions 422.

After the terminal plates 41, 42 are installed to the insulator 35, the connecting portions 411, 421, 422 are cut. FIGS. 6A and 7A show the terminal assembly 30, in which the connecting portions 411, 421, 422 are cut. The terminal assembly 30 holds the terminals 36–40 in such a manner that the terminals 36–40 are held by the insulator 35 while the terminals 36–40, in which the connecting portions 411, 421, 422 are cut, are appropriately arrayed in the corresponding planes S1, S2.

Figure 3A:
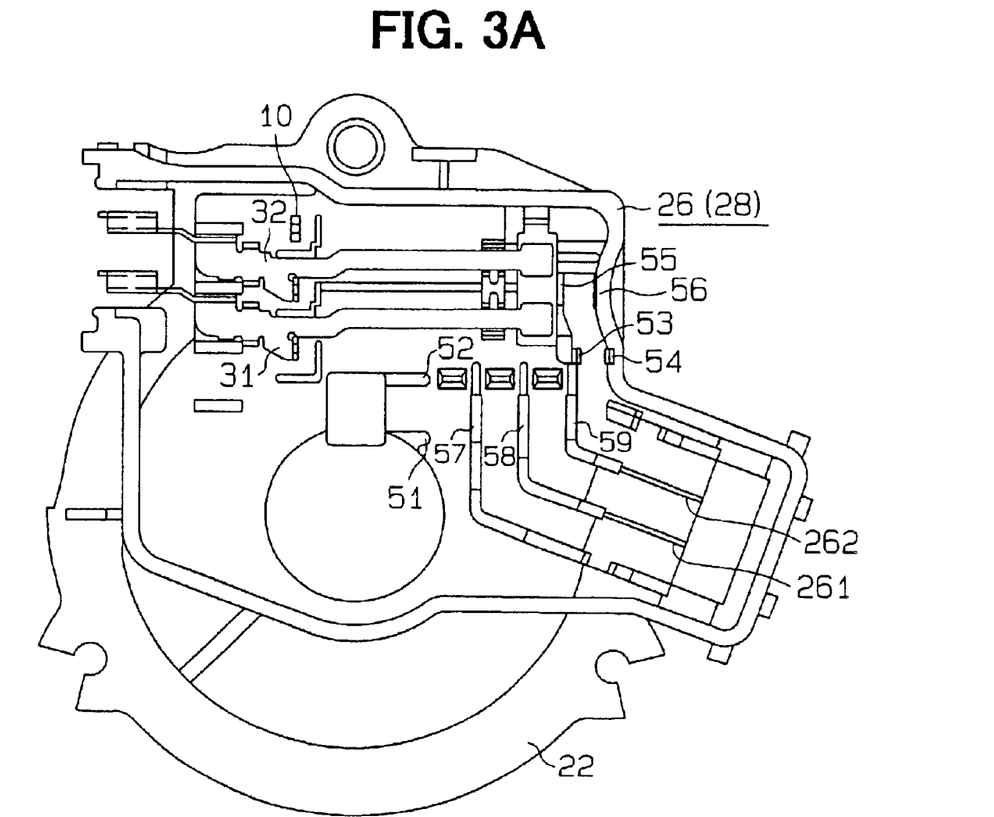
FIG. 3A is an enlarged side view of a first housing segment of a connector housing of the wiper drive motor according to the embodiment.
Figure 4A:
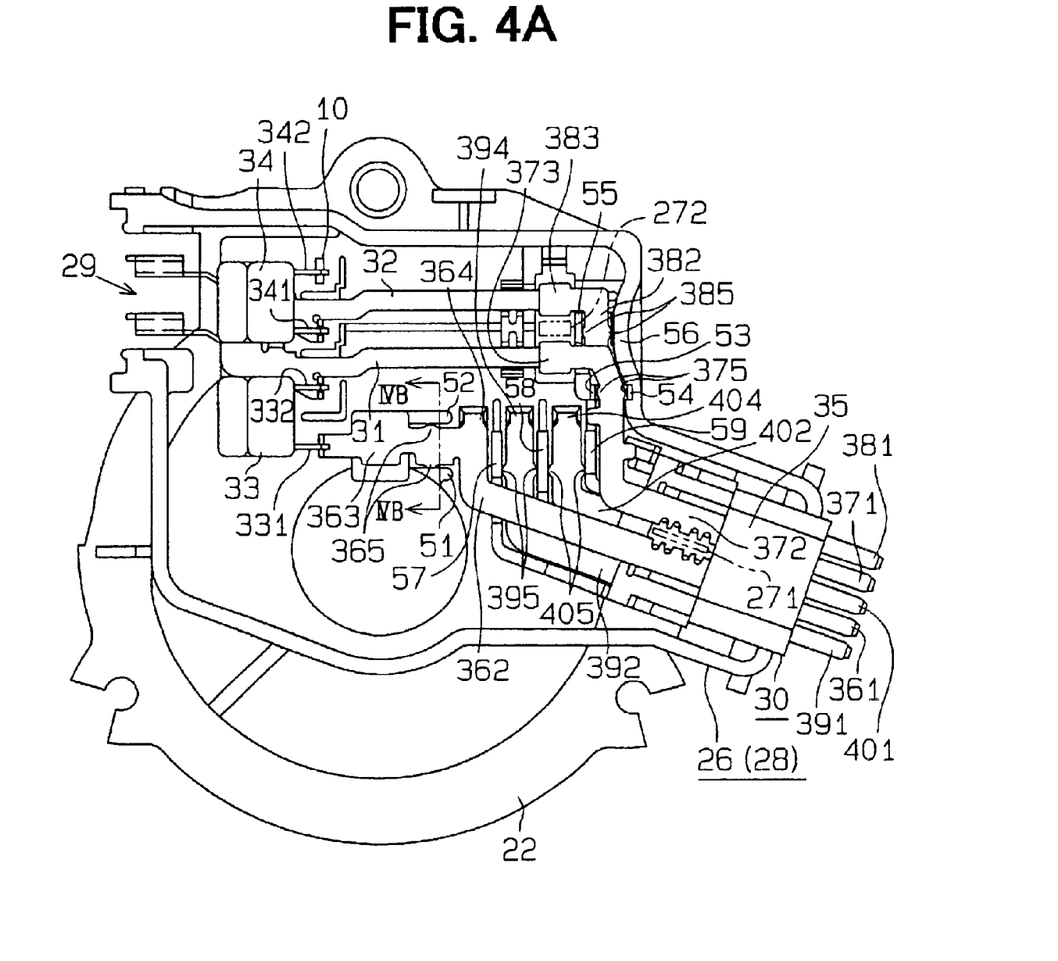
FIG. 4A is an enlarged side view showing a terminal assembly installed to the first housing segment.

As shown in FIGS. 3A and 1B, the internal electrical lines 31, 32 are secured to an internal surface of the first housing segment 26. As shown in FIGS. 4A and 1B, the internal electrical line 31 is connected to a welding portion 373 of the terminal 37 by welding. The internal electrical line 32 is connected to a welding portion 383 of the terminal 38 by welding. The internal electrical conductor portion 362 is electrically connected to the rotational position detector 49, which is located at the inside of the cover 22, through an intermediate connection 364. The internal electrical conductor portions 392, 402 are electrically connected to the rotational position detector 49 through end connections 394, 404, respectively. The capacitor 33 is electrically connected to the internal electrical conductor portion 362 of the terminal 36 through a connecting pin 331 of the capacitor 33 and is also electrically connected to the internal electrical line 31 through another connecting pin 332 of the capacitor 33. The capacitor 34 is electrically connected to the internal electrical line 32 through a connecting pin 341 of the capacitor 34 and is also electrically connected to the internal electrical line 10 through another connecting pin 342 of the capacitor 34. On the backside of the first housing segment 26 (on the backside of FIG. 4A), the connecting pin 342 is electrically connected to the welding portion 363 of the internal electrical conductor portion 362 by welding through the internal electrical line 10. It should be noted that the connection 364, 394, 404 of each of the internal electrical conductor portions 362, 392, 402 is connected to the corresponding one of the contact terminals (stationary contacts) 231 of the rotational position detector 49, which is disposed to the backside of the first housing segment 26.

Figure 9:
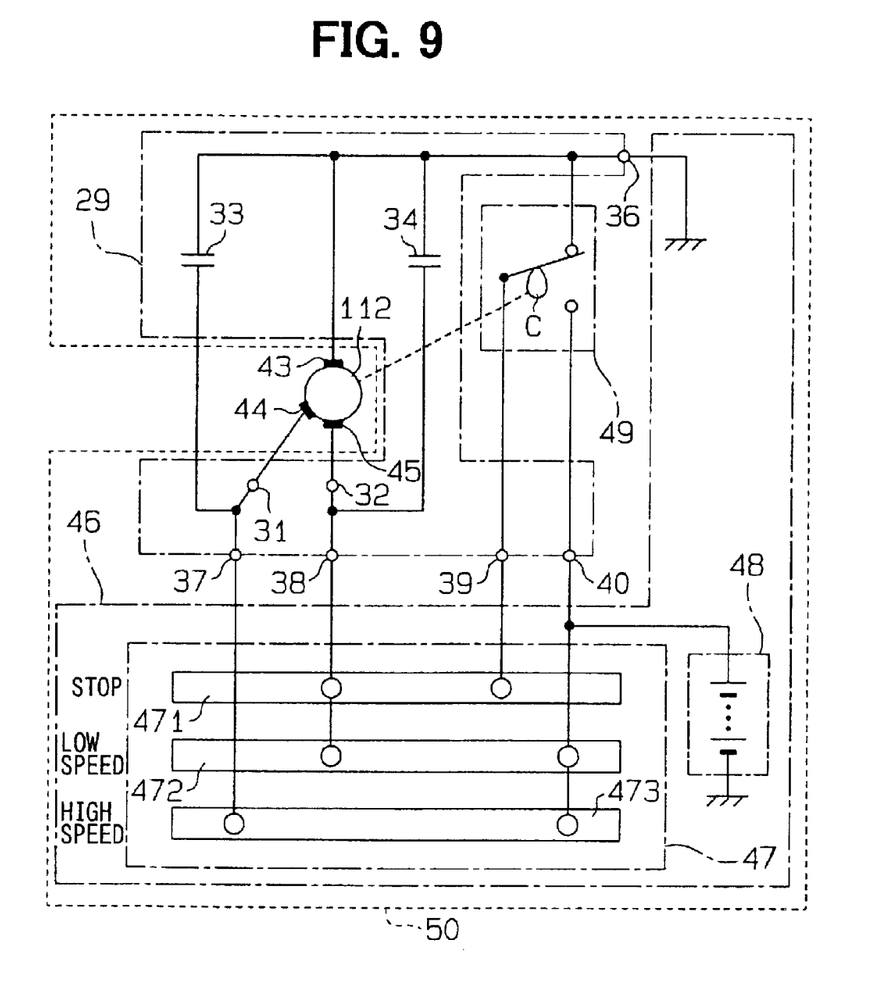
FIG. 9 is a circuit diagram of the wiper drive motor according to the embodiment.

FIG. 9 shows an electrical wiring arrangement of the circuit unit 29. A common ground brush 43 (also shown in FIG. 2A), which slidably contacts with the armature 112 (also shown in FIG. 2A) of the wiper drive motor 11, is electrically connected to the terminal 36. A high speed brush 44 is electrically connected to the terminal 37 through the internal electrical line 31. A low speed brush 45 is electrically connected to the terminal 38 through the internal electrical line 32.

A control device 46 is electrically connected to the terminals 36–40. The control device 46 has a wiper switch 47 and a battery 48. The wiper switch 47 can be switched to one of a stop position 471, a low speed drive position 472 and a high speed drive position 473. When the wiper switch 47 is at the low speed drive position 472, the low speed brush 45 and the battery 48 are electrically connected to each other through the terminal 38 and the wiper switch 47, so that the armature 112 rotates at a low speed. Thus, the wiper blades are swung at a low speed. When the wiper switch 47 is switched to the high speed drive position 473, the high speed brush 44 and the battery 48 are electrically connected to each other through the terminal 37 and the wiper switch 47, so that the armature 112 rotates at a high speed. Thus, the wiper blades are swung at a high speed.

When each wiper blade is at a position other than a predetermined stop position at the time of switching the wiper switch 47 to the stop position 471, the terminal 39 and the terminal 40 are electrically connected to each other through a sliding contact switch of the rotational position detector 49, which is provided at a cam C that rotates synchronously with the wiper drive motor 11. In this way, the low speed brush 45 and the battery 48 are electrically connected to each other through the rotational position detector 49 and the wiper switch 47, so that the wiper blades are swung at the low speed. When each wiper blade moves to the predetermined stop position, the terminal 36 and the terminal 39 are electrically connected to each other through the rotational position detector 49. Thus, the rotation of the armature 112 stops, and each wiper blade stops automatically at the predetermined stop position. The wiper switch 47, the battery 48, the circuit unit 29 and the rotational position detector 49 constitute a fixed position stopping device 50, which automatically stops each wiper blade at the predetermined stop position.

Figure 4B:
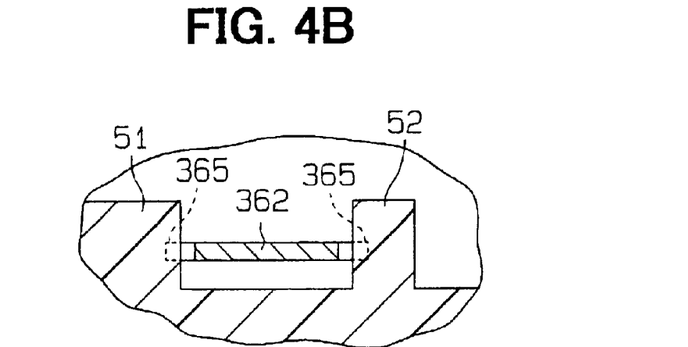
FIG. 4B is a sectional view along line IVB—IVB in FIG. 4A.

As shown in FIGS. 3A and 4A, support portions 51–59 are integrally formed to the internal surface of the first housing segment 26. As shown in FIG. 4A, a pair of claw portions 365 is provided in the internal electrical conductor portion 362 of the terminal 36 in such a manner that each claw portion 365 is formed at a corresponding one of opposed lateral sides of the internal electrical conductor portion 362. Similarly, a pair of claw portions 375, 385, 395, 405 is formed to each of the internal electrical conductor portions 372, 382, 392, 402 of each terminal 37–40. The internal electrical conductor portion 362 is disposed such that the claw portions 365 are positioned between the support portion 51 and the support portion 52. The internal electrical conductor portion 372 is disposed such that the claw portions 375 are positioned between the support portion 53 and the support portion 54. The internal electrical conductor portion 382 is disposed such that the claw portions 385 are positioned between the support portion 55 and the support portion 56. The internal electrical conductor portion 392 is disposed such that the claw portions 395 are positioned between the support portion 57 and the support portion 58. The internal electrical conductor portion 402 is disposed such that the claw portions 405 are positioned between the support portion 58 and the support portion 59. As shown in FIG. 4B, a distance between a distal end of one of the paired claw portions 365 and a distal end of the other one of the paired claw portions 365 is greater than a distance between the support portion 51 and the support portion 52, and the distal ends of the paired claw portions 365 are press-fitted between opposed inner surfaces of the support portions 51, 52. Similarly, the distal ends of the paired claw portions 375 are press-fitted between opposed inner surfaces of the support portions 53, 54. Furthermore, the distal ends of the paired claw portions 385 are press-fitted between opposed inner surfaces of support portions 55, 56. Also, the distal ends of the paired claw portions 395 are press-fitted between opposed inner surfaces of the support portions 57, 58.

Similarly, the distal ends of the paired claw portions 405 are press-fitted between opposed inner surfaces of the support portions 58, 59.

Figure 3B:
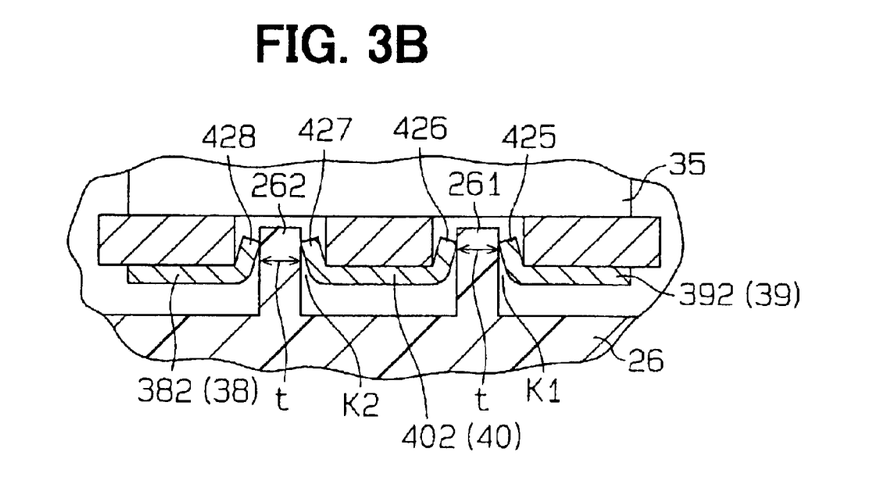
FIG. 3B is an enlarged sectional view along line IIIB—IIIB in FIG. 1B.

As shown in FIG. 3A, a pair of insertion projections 261, 262 is integrally formed to the internal surface of the first housing segment 26. As shown in FIG. 3B, the insertion projection 261 is press-fitted into a gap K1 defined between a cut end 425 and a cut end 426, which are formed upon cutting the corresponding connecting portion 421. Similarly, the insertion projection 262 is press-fitted into a gap K2 defined between a cut end 427 and a cut end 428, which are formed by cutting the corresponding connecting portion 422. In other words, when the first housing segment 26 and the second housing segment 27 are assembled to form the connector housing 28 to house the terminal assembly 30, the insertion projection 261 is press-fitted into the corresponding gap K1 defined between the cut end 425 and the cut end 426, and the insertion projection 262 is press-fitted into the corresponding gap K2 defined between the cut end 427 and the cut end 428.

Figure 5A:
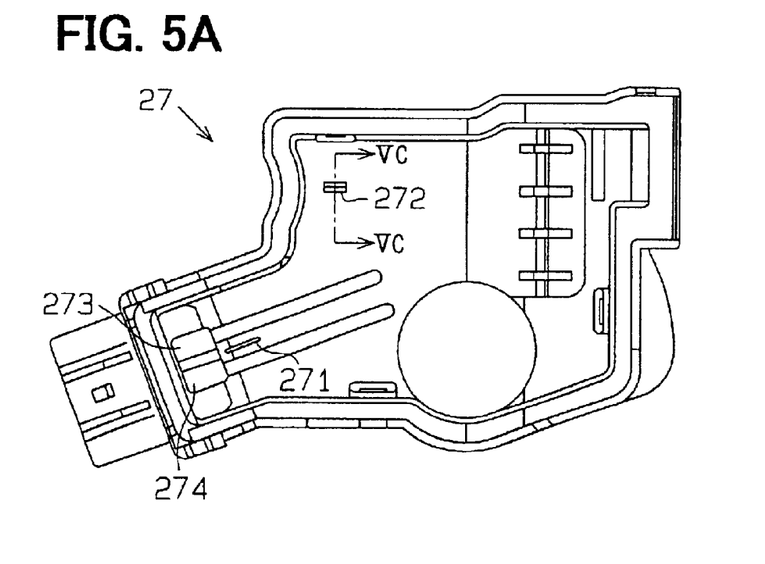
FIG. 5A is an enlarged side view of a second housing segment of the connector housing of the wiper drive motor according to the embodiment.
Figure 5B:
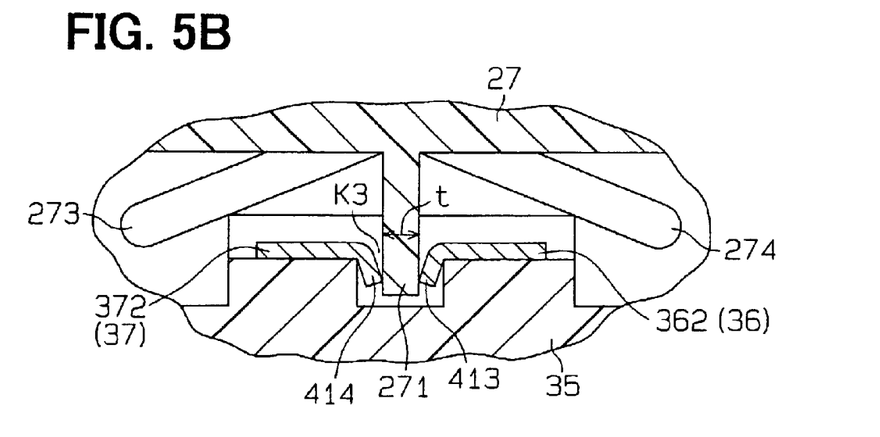
FIG. 5B is an enlarged sectional view along line VB—VB in FIG. 1B.

As shown in FIG. 5A, an insertion projection 271 is integrally formed to an internal surface of the second housing segment 27. As shown in FIG. 5B, the insertion projection 271 is press-fitted into a gap K3 defined between a cut end 413 and a cut end 414, which are produced by cutting the corresponding connecting portion 411. In other words, when the first housing segment 26 and the second housing segment 27 are assembled to form the connector housing 28 to house the terminal assembly 30, the insertion projection 271 is press-fitted into the gap K3 defined between the cut end 413 and the cut end 414.

Figure 5C:
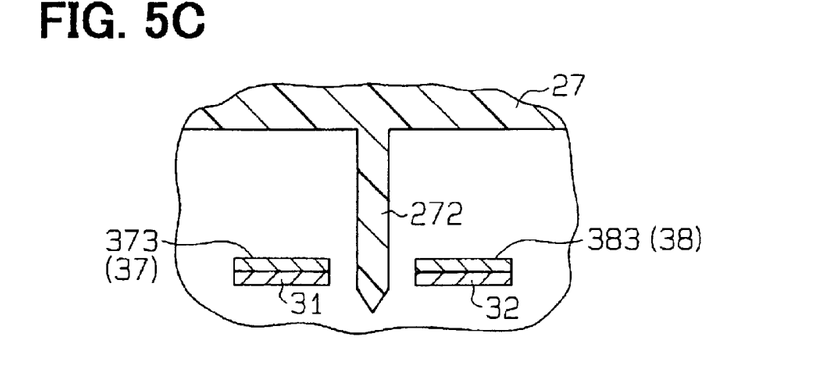
FIG. 5C is an enlarged sectional view along line VC—VC in FIG. 5A.

As shown in FIG. 5A, a separating projection 272 is integrally formed to the internal surface of the second housing segment 27. As shown in FIG. 5C, the separating projection 272 is inserted between the welding portion 373 and the welding portion 383. That is, when the first housing segment 26 and the second housing segment 27 are assembled to form the connector housing 28 to house the terminal assembly 30, the separating projection 272 is inserted between the welding portion 373 and the welding portion 383.

As shown in FIGS. 5A and 5B, a pair of urging protrusions 273, 274 is integrally formed to the internal surface of the second housing segment 27. The urging protrusions 273, 274 are urged against the insulator 35 of the terminal assembly 30 while the urging protrusions 273, 274 are resiliently deformed. The insulator 35 is held between the first housing segment 26 and the second housing segment 27.

A connector device includes the connector housing 28, which houses the terminal assembly 30 and from which the terminals 36–40 extend outwardly. The connector device is manufactured as follows.

(Cutting Process)

After the terminal plates 41, 42 are installed to the insulator 35 by inserting the external terminal portions 361, 371, 381, 391, 401 into the respective terminal holding holes of the insulator 35, the connecting portions 411, 421, 422 are cut.

(Installing Step)
(Temporarily Holding Step)

After the connecting portions 411, 421, 422 are cut, the terminal assembly 30 is installed to the first housing segment 26 in such a manner that the claw portions 365, 375, 385, 395, 405 of the terminals 36–40 of the terminal assembly 30 are press-fitted between the corresponding support portions 51–59. As a result of the press-fitting of the claw portions 365, 375, 385, 395, 405 between the corresponding support portions 51–59, the terminal assembly 30 is temporarily held in a predetermined position with respect to the first housing segment 26.

(Welding Step)

After the terminal assembly 30 is temporarily held at the predetermined position of the first housing segment 26, the welding portions 363, 373, 383 are connected to the internal electrical lines 10, 31, 32, respectively, by welding.

The temporarily holding step and the welding step are included in the installing step.

(Assembling Step)

The first housing segment 26, to which the terminal assembly 30 is installed, is connected to the second housing segment 26 to assemble the connector housing 28. At this assembling step, after the connector housing 28 is assembled, the insertion projections 261, 262, which are provided in the first housing segment 26, are respectively press-fitted into the gaps K1, K2 formed by cutting the corresponding connecting portions 421, 422. The insertion projection 271, which is provided in the second housing segment 27, is press-fitted into the gap K3 formed by cutting the corresponding connection portion 411. Furthermore, the separating projection 272, which is provided in the second housing segment 27, is inserted between the adjacent welding portions 373, 383.

The above embodiment provides the following advantages.

(1-1) When the connecting portions 411, 421, 422 are cut with a press machine or the like, the cut ends (lateral projections) 413, 414, 425–428 are bent with respect to the plane S1, S2 of the terminal plate 41, 42. However, when the connecting portions 411, 421, 422 are simply cut, the cut ends 413, 414, 425–428 could be insufficiently bent. When the terminal assembly 30, which has the insufficiently bent cut ends 413, 414, 425–428, is installed to the first housing segment 26, a space between the cut end 413 and the cut end 414, a space between the cut end 425 and the cut end 426, and/or a space between the cut end 427 and the cut end 428 may become too small or may be eliminated to allow contact between the opposed cut ends 413, 414, 425–428.

When connector housing 28 is assembled to house the terminal assembly 30, the dielectric insertion projection 261 is press-fitted into the gap K1 defined between the cut end 425 and the cut end 426. Likewise, the dielectric insertion projection 262 is press-fitted into the gap K2 defined between the cut end 427 and the cut end 428, and the dielectric insertion projection 271 is press-fitted into the gap K3 defined between the cut end 413 and the cut end 414. The insertion projection 261, which is pressed into the gap K1 defined between the cut end 425 and the cut end 426, prevents contact between the cut end 425 and the cut end 426. The insertion projection 262, which is press-fitted into the gap K2 defined between the cut end 427 and the cut end 428, prevents contact between the cut end 427 and the cut end 428. The insertion projection 271, which is press-fitted into the gap K3 defined between the cut end 413 and the cut end 414, prevents contact between the cut end 413 and the cut end 414. Thus, a failure of electrical insulation between the paired cut ends can be reliably restrained by the corresponding insertion projections.

(1-2) The width t of each insertion projection 261, 262, 271 (shown in FIGS. 3B and 5B) may be selected to be generally equal to a desired distance between the corresponding paired cut ends. In this way, even when a distance between the corresponding paired cut ends is smaller than the desired distance t, the distance between the paired cut ends can be effectively increased to the desired distance t by inserting the insertion projection 261, 262, 271 into the corresponding gaps K1, K2, K3.

(1-3) The connector housing 28 is assembled from a minimum number of parts, that is, the paired housing segments 26, 27. This configuration is convenient for assembling the connector housing 28 and is optimal for simplifying the connector housing 28 assembly process.

(1-4) The position of the cut in each connecting portion 411, 421, 422 must correspond to the position of the corresponding insertion projection 261, 262, 271 when the first housing segment 26 and the second housing segment 27 are put together. When the position of the cut in each connection portion 411, 421, 422 is offset, it could happen that the corresponding insertion projection 261, 262, 271 cannot be press fitted between the corresponding paired cut ends.

Each recess 412, 423, 424 formed in the corresponding connecting portion 411, 421, 422 is the weakest part of the connecting portion 411, 421, 422 in terms of strength. When the corresponding connecting portion 411, 421, 422 is cut, the corresponding recess 412, 423, 424 is broken. Thus, when the connecting portions 411, 421, 422 having recesses 412, 423, 424 are cut, the connecting portions 411, 421, 422 are reliably and easily separated at predetermined positions on the connecting portions 411, 421, 422.

(1-5) When the claw portions 365–405, which are provided in the corresponding internal electrical conductor portions 362–402 of the terminals 36–40, are press-fitted between the corresponding support portions 51–59, the internal electrical conductor portions 362–402 are temporarily held by the first housing segment 26, which includes the support portions 51–59 and the internal electrical lines 10, 31, 32. While the internal electrical conductor portions 362–402 are temporarily held by the first housing segment 26, each of the welding portions 363, 373, 383 (that is, internal electrical conductor portions 362, 372, 382) is welded to the corresponding one of the internal electrical line 10, 31, 32. The temporal holding of the internal electrical conductor portions 362–402 by press-fitting of the claw portions 365–405 between the corresponding support portions 51–59 allows the terminal assembly 30 to be stably held in the predetermined position relative to the first housing segment 26. Thus, the internal electrical lines 10, 31, 32 are welded to the corresponding internal electrical conductor portions 362, 372, 382 at the stabilized state.

(1-6) The temporal holding of the internal electrical conductor portions 362–402 by press-fitting of the claw portions 365–405 between the corresponding support portions 51–59 is maintained even after the assembly of the connector housing 28. Thus, the fixation of the terminal assembly 30 by the welding is maintained in a more stable manner.

(1-7) The terminals 36–40, which constitute the terminal assembly 30, are disposed in the close proximity to each other. Furthermore, the welding portions 373, 383 are also disposed in the close proximity to each other. Thus, when moving to weld at the welding portion 383 after the welding of the welding portion 373, there is the possibility that brazing material will be pulled along so that adjacent welding portions 373, 383 become electrically connected by the brazing material. However, according to the above embodiment, when the connector housing 28 is assembled to house the terminal assembly 30, the dielectric separating projection 272 is inserted between the adjacent welding portions 373, 383. The separating projection 272, which is inserted between the welding portions 373, 383, reliably cuts any brazing material, which could electrically connect between the adjacent welding portions 373, 383. Thus, the separating projection 272 electrically isolates between the welding portions 373, 383.

(1-8) When the connector housing 28 is assembled to house the terminal assembly 30, the urging protrusions 273, 274 in the resiliently deformed state are urged against the insulator 35 of the terminal assembly 30. That is, the insulator 35 is held between the first housing segment 26 and the second housing segment 27. By clamping the insulator 35 between the first housing segment 26 and the second housing segment 27 using the resilient deformation of the urging protrusions 273, 274, the terminal assembly 30 is held reliably in the predetermined position in the connector housing 28.

The above embodiment can be varied or modified in the following manner.

(1) The connector housing can includes three or more housing segments, and the insertion projections to be inserted into the gaps between the corresponding cut ends of the connecting portions can be provided in any of the housing segments.

(2) All of the terminals can be arrayed in the same plane, and all insertion projections can be provided in only one of the housing segments.

(3) The terminals can be formed from conductive metal wire.

(4) The terminals can be disposed on a curved surface.

(5) The claw portions can be provided in only some of the terminals.

Additional advantages and modifications will readily occur to those skilled in the art. The invention in its broader terms is therefore, not limited to the specific details, representative apparatus, and illustrative examples shown and described.

What is claimed is:

1. A connector device comprising:

a terminal assembly, which includes a plurality of terminals, wherein the terminals are arranged in at least one plane and are held by a dielectric holder, and each terminal includes:

an external terminal portion; and an internal electrical conductor portion, wherein the internal electrical conductor portion includes at least one lateral projection, and each lateral projection is bent relative to the at least one plane and is opposed to a corresponding lateral projection of an adjacent one of the terminals; and a connector housing, which includes a plurality of internal electrical lines, wherein the connector housing receives the terminal assembly and includes at least one dielectric insertion projection and a plurality of housing segments, wherein each dielectric insertion projection is provided on at least one of the housing segments and is located between two corresponding opposed ones of the lateral projections, wherein:

at least one of the housing segments includes at least one of the internal electrical lines;

each external terminal portion protrudes outwardly from the connector housing, and each internal electrical conductor portion is received within the connector housing; and at least one of the housing segments includes a plurality of support portions, wherein the support portions are provided on an internal surface of the housing segment and support the internal electrical conductor portions of the terminals.

2. A connector device according to claim 1, wherein the internal electrical conductor portion of at least one of the terminals includes at least one of:
- at least one claw portion, which is press-fitted between two corresponding opposed ones of the support portions; and
- a welding portion, which is welded to a corresponding one of the internal electrical lines.

3. A connector device according to claim 2, wherein:
- at least one of the housing segments includes at least one separating projection;
- each of at least two of the terminals includes the welding portion; and
- each separating projection is placed between two corresponding adjacent ones of the welding portions.

4. A connector device according to claim 3, wherein the housing segments include a first housing segment and a second housing segment, which are opposed to each other.

5. A connector device comprising:
- a terminal assembly, which includes a plurality of terminals, wherein:
  - the terminals are held by a dielectric holder; and
  - each terminal includes an external terminal portion and an internal electrical conductor portion; and
- a connector housing, which receives the terminal assembly and includes a plurality of internal electrical lines and at least one separating projection, wherein:
  - the connector housing includes a plurality of housing segments;
  - each external terminal portion protrudes outwardly from the connector housing, and each internal electrical conductor portion is received within the connector housing;
  - at least one of the housing segments includes a plurality of support portions, wherein the support portions are provided on an internal surface of the housing segment and support the internal electrical conductor portions of the terminals;
  - the at least one separating projection is provided on at least one of the housing segments;
  - each of at least two of the terminals includes a welding portion, which is welded to a corresponding one of the internal electrical lines; and
  - each separating projection is placed between two corresponding adjacent ones of the welding portions.

6. A connector device according to claim 1, wherein the housing segments include a first housing segment and a second housing segment, which are opposed to each other.

7. A wiper drive motor comprising:
- a motor housing, which receives an armature;
- a gear housing, which is connected to the motor housing and receives a speed reducing mechanism, wherein:
  - the gear housing has an open end, which is located adjacent to the speed reducing mechanism; and
  - the speed reducing mechanism reduces a rotational speed of the armature; and
- a cover, which covers the open end of the gear housing and has a connector device, wherein the connector device includes:
  - a terminal assembly, which includes a plurality of terminals, wherein the terminals are arranged in at least one plane and are held by a dielectric holder, and each terminal includes:
    - an external terminal portion; and
    - an internal electrical conductor portion, wherein the internal electrical conductor portion includes at least one lateral projection, and each lateral projection is bent relative to the at least one plane and is opposed to a corresponding lateral projection of an adjacent one of the terminals; and
  - a connector housing, which includes a plurality of internal electrical lines, wherein the connector housing receives the terminal assembly and includes at least one dielectric insertion projection and a plurality of housing segments, wherein each dielectric insertion projection is provided on at least one of the housing segments and is located between two corresponding opposed ones of the lateral projections, wherein:
    - at least one of the housing segments includes at least one of the internal electrical lines;
    - each external terminal portion protrudes outwardly from the connector housing, and each internal electrical conductor portion is received within the connector housing; and
    - at least one of the housing segments includes a plurality of support portions, wherein the support portions are provided on an internal surface of the housing segment and support the internal electrical conductor portions of the terminals.

8. A wiper drive motor according to claim 7, wherein:
- the plurality of housing segments of the connector housing includes a first housing segment and a second housing segment;
- the at least one dielectric insertion projection is provided on at least one of the first housing segment and the second housing segment; and
- the first housing segment is integrally formed to the cover.

9. A wiper drive motor according to claim 8, wherein:
- the first housing segment includes the plurality of internal electrical lines;
- the first housing segment includes the plurality of support portions; and
- the internal electrical conductor portion of at least one of the terminals includes at least one of:
  - at least one claw portion, which is press-fitted between two corresponding opposed ones of the support portions; and
  - a welding portion, which is welded to a corresponding one of the internal electrical lines.

10. A wiper drive motor according to claim 9, wherein the
- the first housing segment includes at least one separating projection, wherein the at least one separating projection is provided in an internal surface of the first housing segment; and
- each separating projection is placed between two corresponding adjacent ones of the welding portions.

11. A wiper drive motor according to claim 7, wherein the internal electrical conductor portion of at least one of the terminals includes at least one of:
- at least one claw portion, which is press-fitted between two corresponding opposed ones of the support portions; and
- a welding portion, which is welded to a corresponding one of the internal electrical lines.

* * * * *